United States Patent
McNeil et al.

[15] 3,668,838
[45] June 13, 1972

[54] FLASH ECONOMIZER

[72] Inventors: Dalph C. McNeil, 43 Pine Street; John A. McNeil, 161 Franklin Avenue, both of Brookville, Pa. 15825

[22] Filed: Dec. 7, 1970

[21] Appl. No.: 95,527

[52] U.S. Cl. .................................. 55/191, 55/193, 55/195, 122/381, 122/382
[51] Int. Cl. ........................................... B01d 19/00
[58] Field of Search .................. 55/185, 191, 193, 195, 204, 55/DIG. 23, DIG. 24; 122/381, 382, 412

[56] References Cited

UNITED STATES PATENTS

| | | | |
|---|---|---|---|
| 1,740,300 | 12/1929 | Henszey | 122/381 X |
| 2,739,668 | 3/1956 | Huge | 55/185 |
| 2,762,451 | 9/1956 | McNeil | 55/204 |
| 3,200,568 | 8/1965 | McNeil | 55/191 |
| 3,286,466 | 11/1966 | Stevens | 122/406 ST |

*Primary Examiner*—Reuben Friedman
*Assistant Examiner*—R. W. Burks
*Attorney*—Green, McCallister & Miller

[57] ABSTRACT

Apparatus and procedure are provided for, in one device or apparatus unit, effectively separating out pure flash or steam from a blow-down discharge and simultaneously effectively recovering heat from the blow-down discharge and, particularly from the more dense portions thereof. Flash separation is accomplished in an upper portion of an enclosed elongated container, condensate recovery and circulation are accomplished in a lower portion, and pressure reduction and heat recovery are principally accomplished in a baffle arch area below the flash separation. The liquid or condensate as discharged from the container has a minimized temperature such that it can be directly discharged into a sewage system without tempering it with and wasting added cooling water. A maximized efficiency of cooling and heat recovery are accomplished in the same container with an efficient to a maximum recovery of pure steam or flash.

20 Claims, 6 Drawing Figures

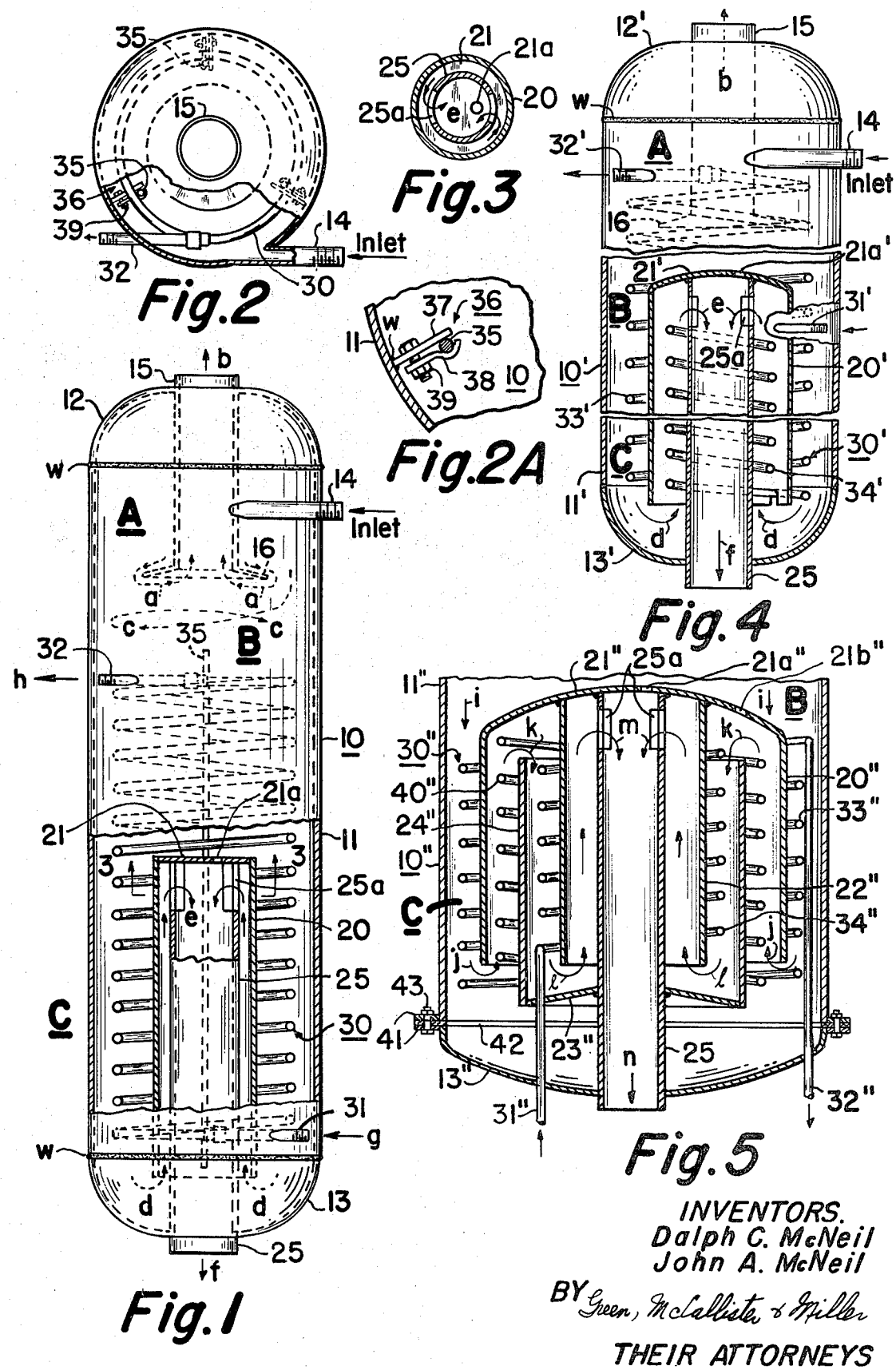

FLASH ECONOMIZER

This invention relates to flash economizing or changing apparatus for reclaiming the B.T.U. or heat content of a hot blow-off discharge from, for example, a boiler or pressure vessel primarily for recovering pure steam or flash while at the same time providing cooled drain water.

Previous to the present invention, it has been customary to employ separate devices or pieces of apparatus in the nature of a flash or blow-down tank and a heat exchanger for accomplishing both a recovery of pure flash and of heat. U.S. Pat. No. 3,200,568 shows and describes a flash separator employed for efficiently and quietly recovering pure steam or flash from a hot-blow down discharge. The present invention deals with the concept of a solution to the problem of devising a single apparatus unit or device which will be relatively simple in construction and operation and which will, at the same time, effectively and in a complementary manner accomplish both flash separation and heat recovery.

We have discovered, contrary to the belief heretofore held by those skilled in the art, that both operations can be efficiently and effectively accomplished in one apparatus or container having, in effect, an upper flash chamber, an intermediate or transfer chamber, and a lower condensate receiving, cooling and B.T.U. take-up chamber. The construction is such that, where desired, cooling and B.T.U. make-up operations may be extended into the intermediate chamber or into the flash chamber.

It has thus been an object of the invention to devise procedure and apparatus for in one container or operative environment simultaneously effecting flash separation and condensate removal, cooling and heat recovery from blow-down such as issuing from boilers and pressure vessels.

Another object has been to devise new and improved apparatus that will function with substantially full or maximum efficiency as a flash separator and will, at the same time, function efficiently as a heat or B.T.U. recovery means.

Another object of the invention has been to devise new and improved heat recovery apparatus that will function with maximum efficiency as a flash separator, not only from the standpoint of recovery of pure steam but also from the standpoint of a more effective and complete cooling of the condensate which is to be discharged.

A further object of the invention has been to devise a flash changer which will function in a complementary manner to reduce high-blow down pressures and minimize drain discharge pressures, minimize the temperature of the drain discharge, effectively separate-out a lower density flash or steam content of the blow-down, and efficiently recover a maximum of the full heat content of higher density portions of the blow-down.

These and other objects of the invention will appear to those skilled in the art from the illustrated embodiments, the description thereof and the claims.

In the drawings, FIG. 1 is a vertical view in elevation and partial section of a flash economizer or changing unit, device or apparatus constructed in accordance with and employing principles of the invention;

FIG. 2 is a top plan view on the same scale as and of the apparatus shown in FIG. 1;

FIG. 2A is an enlarged fragment showing details of the construction of mounting means for a closed heat transfer coil system or assembly;

FIG. 3 is a horizontal section on the scale of FIG. 1 and taken along the line 3—3 thereof;

FIG. 4 is a view similar to and on the scale of FIG. 1 of a modified apparatus; this figure is partially broken away and sectioned.

And FIG. 5 is a fragmental section in elevation of another modified structure on the scale of FIGS. 1 and 4, and particularly illustrating the construction and mounting of its cooling and heat recovery parts or elements.

In accordance with the invention and as illustrated in FIGS. 1, 2 and 3, economizer unit or device 10 has a longitudinally-vertically-extending, rounded, enclosing, sidewall member 11, an upper, inwardly-concave enclosing end wall member 12, and a bottom, inwardly-concave enclosing end wall member 13. The end walls 12 and 13 are shown of rounded or dish-shape to define a smooth wall compartment with the sidewall 11. The wall members 11, 12 and 13 may be of a suitable metal or high temperature resin material and, preferably, the former. Although the shape for simplicity of illustration is shown as cylindrical, it may, if desired, be frusto-conical with a divergence towards its bottom end.

Contaminated steam of a blow-down discharge is introduced into an upper flash chamber A by a horizontally-positioned tangentially-extending inlet pipe or fitting 14 to set-up a centrifugal separating movement such as shown, for example, in FIG. 2 of U.S. Pat. No. 3,200,568 wherein three flow layers exist and consist of an outer, heaviest density layer approaching pure condensate, an intermediate density layer of moisture-laden steam, and an innermost lowest density layer of substantially pure flash or steam. The innermost layer moves vertically-downwardly about a centrally-positioned, tubular discharge pipe 15, over its disc-like baffle 16 and then upwardly-outwardly, as indicated by arrows $a$, $b$, to discharge from the pipe 15.

If the steam is not to be utilized, it may be vented to the atmosphere but will ordinarily be connected for return to a boiler or other vessel for reusage. The apparatus may be constructed as illustrated particularly by the three embodiments represented by FIGS. 1, 4 and 5 to, in the case of FIG. 5, recover a maximum amount of pure steam, in the case of FIG. 4, to recover a maximum quantity of heat by a substantially complete condensation of the steam, or in the case of FIG. 1, to have a good efficiency of both operations.

Referring to FIG. 1, baffle 16 of container 10 defines an open circular or annular area between its outer edges and the inner portion of sidewall 11 sufficient to provide a free downflow of the heavier portions of the fluid into intermediate chamber B. Intermediate chamber B and a lower or condensate collecting and conditioning chamber C are, in effect, defined by an upper end of a drain assembly having an outer, tubular or sleeve-like, flow-directing, outer partition part 20 of cylindrical shape that is open at its lower end, and by an inner, sleeve-like, liquid drain pipe or outlet part 25 of cylindrical shape. The drain part 25 is positioned in a concentric, inwardly-spaced relation along the outer part 20 to extend downwardly therefrom and centrally-outwardly in a sealed-off relation through the bottom end wall 13 of the device 10 to thus serve as a liquid or condensate discharge outlet or vent pipe. The sleeve-like partition part or member 20 is provided with a top end closure wall 21 having a siphon breaker or pressure equalizing vent 21a therethrough; the wall 21 also serves as an end closure wall or arch for the inner, drain part or pipe member 25.

As shown particularly in FIG. 1, the centrally-disposed, vertical, liquid outlet or drain pipe 25 has at least a pair of peripherally spaced-apart windows, side ports or open portions 25a at its upper end that define upper passageways for movement of the liquid. The flow of the heavier or more dense portions of the blow-down, indicated in FIG. 1, is centrifugally-downwardly, see the arrows $c$, from the flash chamber A, into the intermediate chamber B, and then into the collecting chamber C. Thence, the flow of water or liquid, as indicated by the arrows $d$, is vertically-upwardly along the spacing or annular passageway between the parts 20 and 25, through the side ports 25a, see arrows $e$, into the part 25, and finally vertically-downwardly and outwardly from the device 10 through the bottom open end portion of the part 25, as indicated by arrows $f$. The bottom edges of the port or window portions 25a thus define spillways and control or govern the level of the liquid or condensate in the chamber C.

In view of the above construction, the condensate or liquid moves through a labyrinth or in a tortuous, extended, pathway in the chamber C before it leaves the apparatus, in such a manner as to give-up a maximum of its heat or B.T.U. content in such chamber. For the purpose of cooling the condensate or liquid and of recovering heat therefrom, a spiral cooling coil or closed tube assembly 30 is shown in FIG. 1 as extending upwardly within the chamber C in a spaced-intermediate position between the sidewall 11 of the container of the device 10 and the sidewall of the outer sleeve-like partition member or part 20, and upwardly beyond the outer sleeve part 20 into and along the intermediate chamber B. In the embodiment of FIG. 1, a suitable cooling and heat take-up fluid or liquid, such as water, is introduced into the coil system 30 through an inlet fitting 31 that extends in a sealed-off relation through the sidewall 11 adjacent a lower end portion thereof. Heated fluid or liquid is taken-off from the closed cooling coil system 30 through an outlet fitting or pipe 32 that extends in a sealed-off relation through the sidewall 11 from the chamber B and in a spaced relation below the flash baffle 16. The direction of flow is indicated by arrows g and h.

It has been determined that the apparatus arrangement shown in FIG. 1 is highly efficient, both from the standpoint of recovery or reclaiming of normally wasted heat from the liquid, and also from the standpoint of the flash separation out of steam for reuse. In chamber A, a central, low pressure, vortex or annular area is employed for flashing the blow-down introduced through the inlet 14 around the assembly which includes the centrally-disposed discharge pipe 15 and the flash baffle 16. At the same time, it assures a downflow of the heavier density materials, including contaminants, along the inside of the sidewall 11 and along the cooling coil system 30 to fully liquify condensate and simultaneously lower the pressure and temperature of the liquid, in order to, if desired, directly discharge it into a public sewage system without further treatment.

As particularly shown in FIGS. 1 and 2, the coil assembly 30 may be securely-removably mounted within the container of the device 10 by a group of peripherally spaced-apart and vertically-extending tie rods 35 which are positioned on the inside of the coil assembly and which are removably-gripped by clamping finger assemblies 36 that are positioned in a vertically-spaced relation along the sidewall 11. Each clamping assembly 36, as shown particularly in FIGS. 2 and 2A, has a radial-inwardly projecting clamp arm or fixed-position clamping finger 37 that is weld-secured to project from the inner side of the wall 11, and a clamping finger 38 which is removably-secured to the finger 37 by a nut and bolt assembly 39. The inner end of the finger 38 is curved to fit the contour of the associated rod 35 and cooperates with the fixed finger 37 to securely grip the rod and, in so doing, in combination with one or two additional like rod and clamp assemblies, hold or clamp convolutions of the assembly 30 in a central position within the container. The fingers 37, 38 also as shown in FIG. 2, serve as shelf-like support means for adjacent convolutions.

In the device 10' of the embodiment of FIG. 4, the construction is substantially the same as the embodiment of FIG. 1 from the standpoint of the parts 15 and 25 and the flow of liquid therealong, as well as in the construction and mounting of the flash parts of chamber A. However, the construction and mounting of the spiral cooling coil assembly 30' is different. The assembly 30' has an outer spiral part 33' that is mounted and constructed substantially the same as 30 of FIG. 1, but extends upwardly to a position about and above the flash baffle 16 and partially along the flash vent 15 to terminate at its upper end adjacent to but slightly below the blow-down or steam inlet 14. Also, the assembly 30' has an inner spiral coil part 34' which is connected in a continuous manner with the lower end of the coil part 33' and extends upwardly along and in a slightly spaced relation with respect to the sleeve-like partition part 20. The outer coil part 33' is shown positioned the spacing of and substantially intermediate or halfway between the inner wall of the container 10' and the outer wall of baffle 20', and the inner coil part 34' is shown positioned in the spacing of and intermediate or halfway between the inner wall of the baffle 20' and the outer wall of the pipe 25. The flow of cooling water in the assembly 30' is through an inlet fitting 31' that is located in the chamber B adjacent an upper end portion of the outer sleeve part 20, and through an outlet fitting 32' that is located above the dish-shaped flash baffle 16, but below the steam inlet fitting 14.

The construction of FIG. 4 as thus described and shown provides a maximum efficiency of pressure reduction and cooling action as well as of B.T.U. or heat recovery, and is particularly suitable where a maximum of pure steam production or separation is not desired as, for example, where the pure steam would ordinarily be vented to the atmosphere. The coil assembly or system 30' may, like the system 30 of FIG. 1, be mounted by the use of rods 35 and clamps 36 cooperating with the turns or convolutions of the outer coil part 33' and secured on and within the inside of the container of the device 10'. In another arrangement, the clamps 36 may be mounted at substantially right angles with respect to the position shown in FIG. 2A, either on the inside of the container sidewall 11' or on the outside of the baffle 20', to directly clamp-engage upper and lower convolutions of the outer coil part 33'. However, the fact that the lower end of the outer coil part 33' is integrally connected at its lower end to the inner coil part 34' and connected at its upper end to the outlet pipe 32', assures an effective mounting of the inner and outer parts of coil assembly 30''.

A further embodiment represented by device 10'' of FIG. 5 has been disclosed for obtaining a good efficiency of pressure reduction, cooling action and B.T.U. recovery from the condensate and, at the same time, for providing a maximum of recovery of pure steam for reuse and with a minimum of vertical size or extent of the container. The coil assembly 30'' of the device 10'', like the assembly 30' of the embodiment of FIG. 4, has an outer coil part or assemblage 33'' and an inner part or assemblage 34''. However, it additionally has an intermediate part or coil assemblage 40''. As shown, cooling fluid or liquid is introduced through inlet fitting 31'' to flow upwardly along the inner coil part 34'', along coil parts 40'' and 33'' and out through outlet fitting 32''. This endwise mounting for both the inlet and outlet members illustrated by 31'' and 32'' of FIG. 5 may also be employed instead of the side positioning represented by 31 and 32 of the embodiment of FIG. 1 and by 31' and 32' of the embodiment of FIG. 4. At its upper end, the inner coil part 34'' is integrally connected with the upper end of the intermediate part 40'', and the lower end of the intermediate coil part 40'' is integrally connected with the lower end of the outer coil part 33''. This provides a continuous coil passageway for the reverse flow of entering cooling fluid along the lower or collecting chamber C. Inlet fitting 31'' and outlet fitting 32'' extend in a sealed-off relation through bottom end wall portion 13''.

In the embodiment of FIG. 5, the innermost and the coolest coil part 34'' of the assemblage is shown mounted to extend about and upwardly in a midway spaced relation along and between an inner annular or cylindrical-shaped baffle wall or member 22'' and an intermediate baffle wall or member 24''. The baffle 22'' has a radially outwardly spaced relation with inner drain part or pipe member 25 to provide a flow passageway therealong, and has a radially inwardly spaced relation with respect to second or intermediate annular baffle member or wall 24''. The innermost baffle member 22'' is at its upper end weld-secured to extend downwardly from and inwardly concave and outwardly convex, end enclosing wall member 21'' which encloses all of the baffle members since it is connected to outermost baffle member 20''. An intermediate coil assembly 40'' is shown mounted to extend downwardly about and in a midway spaced relation along and between the intermediate baffle member 24'' and an outer baffle wall or member 20''. A bottom end or closure wall 23'' extends from the lower end of the intermediate baffle member 24'' and is secured, as by weld metal, to the drain pipe 25 to thus provide a flow chamber along the sides of the innermost baffle 22''. The bottom end or closure wall 23'' slopes upwardly inwardly from the baffle 24'' towards the baffle 22''.

Outer wall assemblage 33'' is shown mounted to extend in a midway spaced relation about and along and between outer cylindrical wall or baffle member 20" and the inner side of the wall 11" of the container. The flow path of the blow-down within the lower chamber C of the embodiment of FIG. 5 is illustrated by arrows $i, j, k, l, m$ and $n$. It is accomplished in such a manner as to provide a maximum of heat recovery by the fluid or liquid which is circulating through the coil system and is removed through the outlet 32". The drain pipe 25, like the drain pipe of the embodiments of FIGS. 1 and 4, has a pair of side ports, open portions or windows 25a at its upper end to define passageways (see the arrows $m$) from the upper end of the coil system at the innermost chamber defined by the baffle 22" and the end wall 23". The top end closure wall 21", like wall 21' of the embodiment of FIG. 4, has a circular, dished, curvilinear and outwardly convex shape to direct any condensate or fluid that flows downwardly from chamber B towards the outer sidewall of the container 11" to flow downwardly along the outer peripheral area of the coil assemblage, as indicated by the arrows $i$. The vents 21a', 21a" and 21b" of the embodiments of FIGS. 4 and 5 serve the same purpose as the vent 21a of the embodiment of FIG. 1.

To facilitate cleaning and inspection, as well as the assembly of the construction shown in FIG. 5, end closure wall member or part 13" is shown removably secured by gasketing 42, cooperating flanges 41, and bolt and nut assemblies 43 to the lower end of the main sidewall 11" of the container of the device 10". It will be noted that the cooling assembly 30" of FIG. 5 is substantially fully located within the liquid or condensate collecting lower chamber C and, unlike the embodiment of FIG. 1, does not extend into the intermediate chamber B, and unlike the embodiment of FIG. 4, does not extend into the flash chamber A. For an efficient recovery of heat and a maximum recovery of pure flash or steam, the embodiment of FIG. 5 is representative, for a maximum recovery of heat, the embodiment of FIG. 4 is representative, and for a good overall efficiency of both flash and heat recovery, the embodiment of FIG. 1 is representative. In the embodiment of FIG. 5, the upper portion of the construction of the device 10" is the same as in the embodiments of FIGS. 1 and 4, except that the coil assembly 30" does not extend up along either the chamber B as in FIG. 1 or up along chambers B and A as in FIG. 4.

In referring to a flash economizer or changer, we have reference to a device or unitary apparatus 10, 10' or 10" which will serve for both separating out pure steam, condensate or liquid from blow-down steam and the like and which, at the same time, will provide an efficient lowering of attendant pressure and heat, condense higher density portions of the blow-down, and separate the low density pure steam or flash from other portions of the blow-down.

What is claimed is:

1. In a flash changing apparatus having the capability of flash separation and heat recovery from contaminated blow-down discharge fluid supplied under positive pressure from a boiler or pressure vessel, a vertically elongated enclosed container having side and top and bottom end walls defining an elongated compartment therein, a blow-down inlet fitting extending through said side wall and open to said compartment adjacent an upper end portion thereof, a flash separating and pure steam venting assembly projecting through said top end wall into said compartment within the upper end portion thereof and cooperating with said blow-down inlet fitting to define a flashing chamber within the upper end portion of said compartment, a drain assembly in a vertically extending relation along a lower end portion of said compartment defining a condensate and liquid collecting and conditioning lower chamber therein, a vertically elongated portion of said compartment connecting said flashing chamber with said lower collecting chamber and defining an intermediate chamber, a closed tubular heat-exchange assembly positioned in said lower chamber in a cooperative relation with said drain assembly for removing heat from liquid in said lower chamber and reducing its temperature before discharge by said drain assembly, said drain assembly having vertical wall members extending upwardly within said lower chamber in a spaced relation with respect to said side wall and defining a passageway for upward movement of liquid between said members over an upper edge of an inner one of said members and downwardly outwardly along said inner member and through the bottom end wall of said container.

2. In a flash changer as defined in claim 1, an upper end wall connected to and enclosing upper end portions of said drain assembly, and port means extending through an upper end portion of said inner wall member to pass an upward flow of the liquid from an outer one of said wall members into and downwardly along said inner wall member.

3. In a flash changer as defined in claim 2, said upper end wall being of upwardly facing convex shape.

4. In a flash changer as defined in claim 1, said inner wall member having a lower end portion extending through the bottom end wall of said container in a sealed-off relation with respect thereto and having an upper lip edge over which the liquid flows and which defines the level of liquid in said lower chamber.

5. In a flash changer as defined in claim 4, said drain assembly having an intermediate wall member, and a bottom end wall connecting a bottom end portion of said intermediate wall member to said inner wall member and defining a bottom enclosure between said inner and intermediate wall members.

6. In a flash changer as defined in claim 4, said drain assembly having an outer wall member extending in a radially outwardly spaced relation along said inner wall member and terminating at its lower end in an upwardly spaced relation with respect to said bottom end wall, and said heat-exchange assembly having spiral tubular convolutions extending along the inside of said outer wall member within said lower chamber.

7. In a flash changer as defined in claim 6, said outer wall member having a cross-extending closed upper end wall connected to said inner wall member in an upwardly spaced relation with respect to said lip edge to close-off the upper end of said outer wall member with respect to said intermediate chamber.

8. In a flash changer as defined in claim 7, an open port portion through said cross-extending upper end wall for equalizing pressure within said drain assembly and preventing an air lock.

9. In a flash changer as defined in claim 1, said heat-exchange assembly being a tubular coil assembly extending about said drain assembly and thereabove into and along said intermediate chamber.

10. In a flash changer as defined in claim 1, said heat exchange assembly being a tubular coil assembly extending along and about said drain assembly upwardly from said lower chamber along said intermediate chamber and into said flashing chamber, and terminating at a position below and adjacent to said blow-down inlet fitting.

11. In a flash changer as defined in claim 1, said heat exchange assembly having a continuous tubular coil spirally extending along said bottom chamber into said intermediate chamber, means supporting said heat exchanger assembly in a spaced relation along said drain assembly, a fluid inlet fitting connected to a lower end of said coil and extending in a sealed-off relation through a lower portion of said side wall from said lower chamber, and a fluid outlet fitting connected to an upper end of said coil and extending in a sealed-off relation through said side wall from said intermediate chamber.

12. In a flash changer as defined in claim 1, said heat exchange assembly having inner and outer tubular coil parts that are continuously connected at ends of said heat exchange assembly and that are positioned about said drain assembly, and fluid inlet and outlet fittings extending in a sealed relation through said container and connected to said coil parts.

13. In a flash changer as defined in claim 12, said fluid inlet and outlet fittings extending through said bottom end wall of said container.

14. In a flash changer as defined in claim 12, said outer coil part extending above said drain assembly along said intermediate chamber into a lower end portion of said flash chamber, said fluid inlet fitting extending through said side wall of said container adjacent an upper end portion of said lower chamber, and said fluid outlet fitting extending through said side wall adjacent a lower portion of said flashing chamber.

15. In a flash changer as defined in claim 1, said flash assembly having a centrally disposed open-end flash vent member extending in a sealed-off relation through said top end wall of said container, and having a dish-shaped flash baffle extending radially outwardly from a lower end of said vent member for, in combination with said vent member and said blow-down inlet fitting, separating-out relatively pure steam and moving it upwardly through said vent member and discharging heavier density portions of the blow-down through said intermediate chamber into said lower chamber.

16. In a flash changer as defined in claim 15, said heat exchange assembly being a continuous coil assembly extending upwardly from said lower chamber about said flash baffle and along a lower portion of said flash vent member below said blow-down inlet fitting.

17. In a flash changer as defined in claim 1, said drain assembly having a group of vertically extending baffle wall members in a flow-space defining relation with respect to each other and with respect to said inner wall member, passageway means and end walls defining a continuous reversing up and down liquid flow path between said baffle wall members and into an upper end portion of said inner wall member, said tubular assembly defining vertically extending and radially spaced-apart and endwise-connected coil parts extending along the spacing between said baffle wall members and along the spacing between an outermost baffle wall member and the inside of side wall of the container, a cooling liquid inlet connected to the end of an innermost coil part, a liquid outlet connected to the end of an outermost coil part, and said inlet and outlets extending in a sealed relation out through said container.

18. In a flash changer as defined in claim 17, said tubular assembly having a substantially midway positioning horizontally-transversely of the spacing between said baffle wall members and between said outermost baffle wall member and the side wall of the container.

19. In a flash changer having the capability of flash separation and heat recovery from contaminated blow-down discharge fluid supplied under positive pressure from a boiler or pressure vessel, a vertically elongated enclosed container having a circumferentially rounded side wall and rounded top and bottom end walls defining an elongated compartment therein, a blow-down inlet fitting extending tangentially through said side wall and open to said compartment adjacent an upper end portion thereof, a tubular flash discharge member extending centrally downwardly through said top end wall in a sealed relation with respect thereto and terminating in an outwardly downwardly sloped annular flash baffle to define a flashing chamber within the upper end portion of said compartment, a drain assembly in a centrally disposed vertically extending radially inwardly spaced relation in a lower end portion of said compartment defining a condensate and liquid collecting and conditioning lower chamber therein, an intermediate chamber in said compartment between said flashing and said lower chambers for receiving higher density material from said flashing chamber that passes downwardly between said side wall and an outer edge of said flash baffle, a closed tubular heat-exchange assembly in a radially spaced relation vertically along said drain assembly for removing heat from liquid freely falling from said flashing chamber through said intermediate chamber into said lower chamber; said drain assembly comprising, a tubular drain pipe extending in a sealed relation centrally outwardly through said bottom end wall and in a centrally spaced relation vertically upwardly along and within said lower chamber, and a sleevelike partition member having a lower open end portion and a closing upper end wall; said closing upper end wall being secured to an upper end portion of said drain pipe, said partition member extending in a radially outwardly spaced relation along and with respect to said drain pipe within said lower chamber, said drain pipe having an upper edge defining a side window portion open between said drain pipe and said closing upper end wall of said partition member, whereby liquid may enter through the lower open end portion of said partition member to pass upwardly along the spacing between said partition member and said drain pipe over said upper edge and through said window portion into said drain pipe and downwardly outwardly from within said drain pipe, and a pressure equalizing port portion through said closing upper end wall that is open to said intermediate chamber.

20. In a flash changer as defined in claim 19, an innermost first and an outermost second baffle member extending along the spacing between said drain pipe and said partition member in a radially spaced relation with respect to each other and with respect to said drain pipe and said partition member, said second baffle member being connected to and being closed-off at its upper end by said upper end wall, a closing bottom end wall extending upwardly inwardly from a bottom end of said first baffle member to said drain pipe in a downwardly spaced relation with respect to said first baffle member to define a passageway about the lower end of said first baffle member, said first baffle member having its upper end in a downwardly spaced relation with respect to said upper end wall to define a passageway about the lower end of said second baffle member, the spacing between said first baffle member and said partition member being open to said lower chamber, pressure equalizing port means opening through said closing upper end wall to spacing between said first baffle member and said partition member and between said first baffle member and said second baffle member, and said heat-exchange assembly having parts that extend in a continuous manner along the spacing between said drain pipe, baffle and partition members.

* * * * *